United States Patent

Kawaguchi et al.

[11] Patent Number: 6,035,090
[45] Date of Patent: Mar. 7, 2000

[54] OPTICAL FIBER CABLE TERMINAL STRUCTURE AND CAP MEMBER USED IN THE SAME

[75] Inventors: Akira Kawaguchi; Noriko Sudoh, both of Tokyo, Japan

[73] Assignee: The Whitaker Corporation, Wilmington, Del.

[21] Appl. No.: 08/989,129

[22] Filed: Dec. 11, 1997

[30] Foreign Application Priority Data

Dec. 11, 1996 [JP] Japan .................................... 8-351897

[51] Int. Cl.[7] .............................................. G02B 6/00
[52] U.S. Cl. ............................................ 385/139; 385/86
[58] Field of Search ...................... 385/86, 139

[56] References Cited

U.S. PATENT DOCUMENTS

| 5,315,684 | 5/1994 | Szegde | 385/139 |
| 5,461,690 | 10/1995 | Lampert | 385/139 |
| 5,644,673 | 7/1997 | Patterson | 385/139 |

FOREIGN PATENT DOCUMENTS

| 59-37516 | of 1984 | Japan | G02B 7/26 |
| 2-134502 U | of 1990 | Japan | G02B 6/38 |
| 4-46411 U | of 1992 | Japan | G02B 6/36 |

*Primary Examiner*—Rodney Bovernick
*Assistant Examiner*—Robert E. Wise

[57] ABSTRACT

The present invention provides an optical fiber cable terminal structure which includes a cap member that eliminates any danger of cutting of a reinforcing member even when external forces are applied to the optical fiber cable, and which allow easy re-engagement of an engaging member and an outer covering of the optical fiber cable. The optical fiber cable terminal structure includes a substantially cylindrical cap member (10). The cap member (10) has a cavity (50) inside, and further has a curved surface (35a) on an end surface (35). Curved surface (35a) provides a smooth continuation between an inside surface (36) and an outside surface (32). Reinforcing member (170) of optical fiber cable (100), which is passed through the cavity (50) and folded back along the curved surface (35a), can be fastened to the outer surface (32) by the press-fitting of a sleeve member (90) onto outside surface (32). An engaging member (70) which engages with an outer covering (110) of the optical fiber cable (10) protrudes from rear surface (31) of the cap member (10).

8 Claims, 2 Drawing Sheets

OPTICAL FIBER CABLE TERMINAL STRUCTURE AND CAP MEMBER USED IN THE SAME

FIELD OF THE INVENTION

The present invention relates to an optical fiber cable terminal structure which is used for the connection of optical fiber cables to optical connectors, and a cap member and sleeve member which are used in this terminal structure.

BACKGROUND OF THE INVENTION

Optical fiber cable assemblies, which contain at least one optical fiber, ordinarily include a reinforcing member made of Kevlar on the inside of the cable cover. Accordingly, when the optical fibers contained in the fiber cable are connected to optical connectors, a terminal structure is required in order to terminate the cable cover and the reinforcing member at the end of the cable cover.

One example of a conventional terminal structure is disclosed in Japanese Patent Application No. 59-37516. In the disclosed terminal structure, a sleeve, which has a substantially cylindrical shape is installed at the end of the cable cover, and the reinforcing member extending from the end of the cable cover is folded back over the outside surface of the sleeve. A compression sleeve is installed over the outside of the folded-back reinforcing member, and the reinforcing member is fastened in place by press-fitting the compression sleeve thereon.

However, in the terminal structure described above, the reinforcing member is fastened in place by press-fitting with the reinforcing member coming into direct contact with the edge of the sleeve, which is made of metal, at the end position of the cable cover. As a result, the following problem arises: namely, in cases where a tensile force or twisting force is applied to the cable, the edge of the sleeve cuts or severs the reinforcing member so that the fastening of the end portion becomes unstable. Accordingly, there has been a need to provide a terminal structure in which there is no danger of the reinforcing member being cut.

Furthermore, there is a need to include a means which supports the outer cover of the optical fiber cable in such a terminal structure, especially in the cap member used in the terminal structure. In particular, optical fiber cables may be subject to external forces which cause the outer covering of the cable to be removed from the supporting means when the cable is bent in order to achieve the desired cable installation. Accordingly, it is desirable that easy reattachment be possible even in cases where the outer covering of the cable slips from the supporting means. In addition, it is desirable that such a terminal structure have a relatively simple construction, and that the structure be relatively inexpensive. In particular, it is desirable that the economic effect be enhanced and assembly work be facilitated by reducing the number of parts required.

SUMMARY OF THE INVENTION

The present invention provides an optical fiber cable terminal structure which includes a cap member having a substantially cylindrical shape, and which has inside and outside surfaces, a curved surface smoothly connects the inside surface and the outside surface at one end of the cap member with respect to the direction of length, an engaging member which engages with an inside surface of the outer cover of an optical fiber cable at an opposite end of the cap member, and a sleeve member which press-fits to the outside surface of the cap member a reinforcing member which extends from the optical fiber cable, passes through the cap member and is folded back over the curved surface at the end of the cap member.

Furthermore, the present invention also provides a cap member used in an optical fiber cable terminal structure, wherein the cap member has a substantially cylindrical portion and has inside and outside surfaces, a curved surface that smoothly connects the inside surface and the outside surface formed at one end of the cap member with respect to the direction of length, a fastening member is provided which fastens to the outside surface a reinforcing member of an optical fiber cable which passes through the cap member and is folded back over the end of the cap member, and an engaging member which engages with an inside surface of an outer cover of the optical fiber cable is located at the opposite end of the cap member.

Preferably, the engaging member has a cylindrical shape, and barb projections are formed in the vicinity of a rim of a tip end of the engaging member. In particular, it is desirable that the engaging member be formed with a relatively small thickness, and that the cylindrical portion of the cap member be formed with a relatively large thickness.

Preferably, the outside surface of the cap member has indentations and projections corresponding to a fastening portion which fastens the reinforcing member thereto. This portion with a shape showing indentations and projections may be formed by forming numerous grooves in the outside surface, or by subjecting the outside surface to serrations, roulettes or threads.

Preferably, a protruding limiting wall is formed for the purpose of positioning the sleeve member in a position located in the vicinity of the end surface at the opposite end of the outside surface.

BRIEF DESCRIPTION OF THE DRAWINGS

An embodiment of the present invention will now be described by way of example with reference to the accompanying drawings in which.

DETAILED DESCRIPTION OF THE INVENTION

Figure 1:
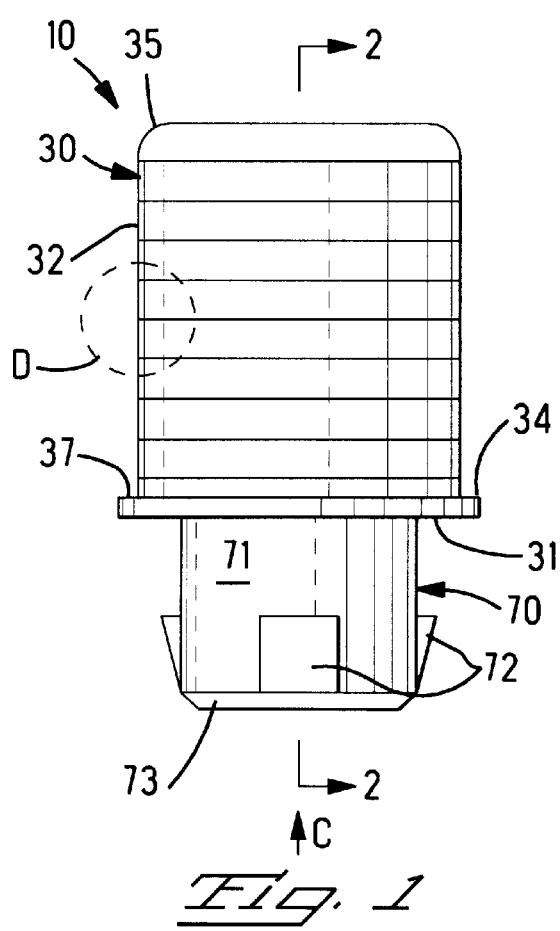
FIG. 1 is a front view of a cap member as part of an optical fiber terminal structure of the present invention.
Figure 2:
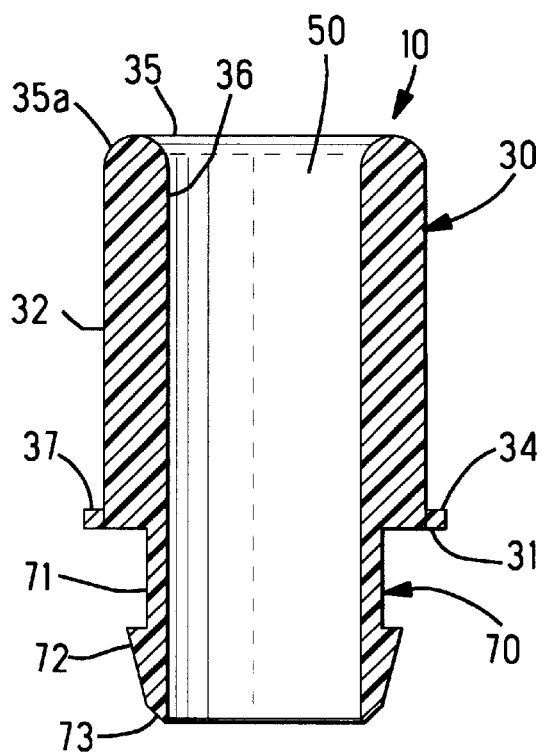
FIG. 2 is a cross-sectional view of FIG. 1 taken along line 2—2 thereof.
Figure 4:
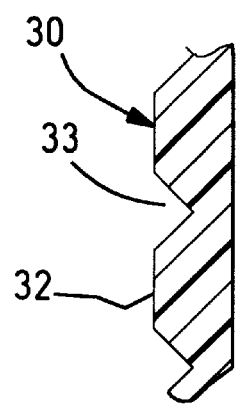
FIG. 4 is a part cross-sectional view which shows the configuration of the portion indicated by D in FIG. 1 in enlarged detail.

Cap member 10 has a substantially cylindrical main body section 30 and a substantially cylindrical outer covering engaging section 70 which protrudes downward from surface 31 of the main body section 30. As is shown in FIG. 1, the main body section 30 has a larger diameter than the outer covering engaging section 70. Furthermore, as is shown in FIG. 2, the outer covering engaging section 70 has a smaller thickness than the main body section 30. A plurality of grooves 33, which are substantially triangular in cross section, are located in an outside surface 32 of the main body section 30 as shown in FIG. 4, thus forming a surface which has indentations and projections. An annular projection 34 protrudes outward from the outside surface 32 while delineating the surface 31. The effect of annular projection 34 will be described later.

As shown in FIG. 2, the main body section 30 and outer covering engaging section 70 are hollow, so that a cavity 50 extends therethrough. Cavity 50 passes through the main body section 30 and the outer covering engaging section 70 with a uniform diameter. Furthermore, as shown in FIG. 2, the end surface of the main body section 30 includes a curved surface 35a. Accordingly, the inside surface 36 of the main body section 30, which is determined by the cavity 50 is smoothly continued to the outside surface 32 via the curved end surface 35a.

Figure 3:
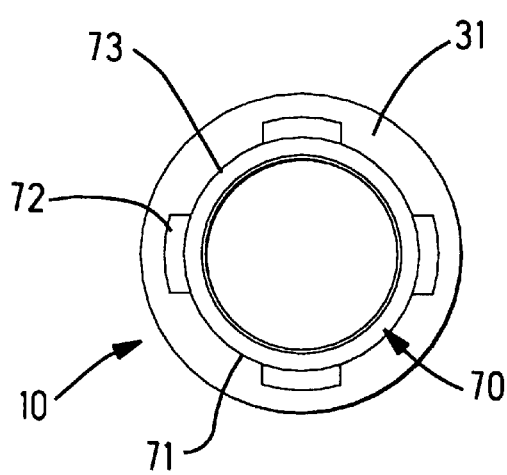
FIG. 3 is a view from a direction indicated by arrow C in FIG. 1.

As seen from FIGS. 1 and 3, reverse barb projections 72 are disposed at four places on the outside surface 71 of the outer covering engaging section 70. These projections 72 are arranged so that they can engage with the inside surface of the outer covering of the optical fiber cable. The action of this engagement will be described later. Furthermore, as shown in FIGS. 1 and 2, the bottom surface 73 of the outer covering engaging section 70 is inclined inward so that there is a reduction in diameter.

Cap member 10 is preferably formed from a resin material such as PBT (polybutylene terephthalate) or similar material.

Figure 5:
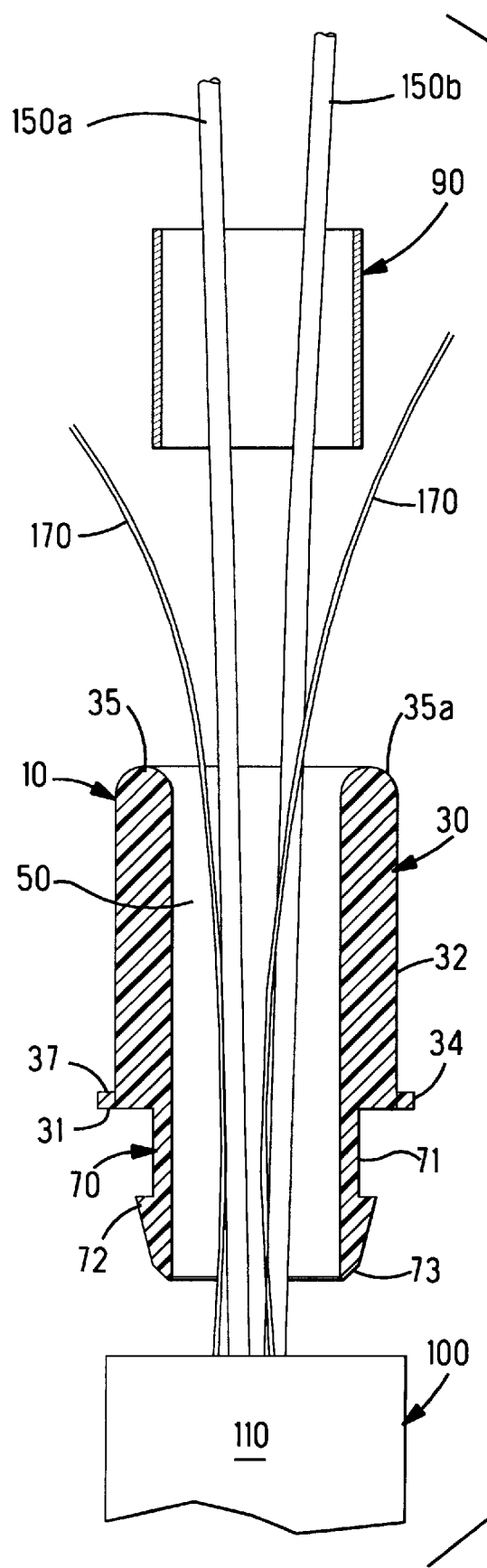
FIG. 5 shows an exploded view of a stripped end of a fiber optic cable, a cap member and a sleeve member in cross section prior to being assembled onto the stripped end of the fiber optic cable.
Figure 6:
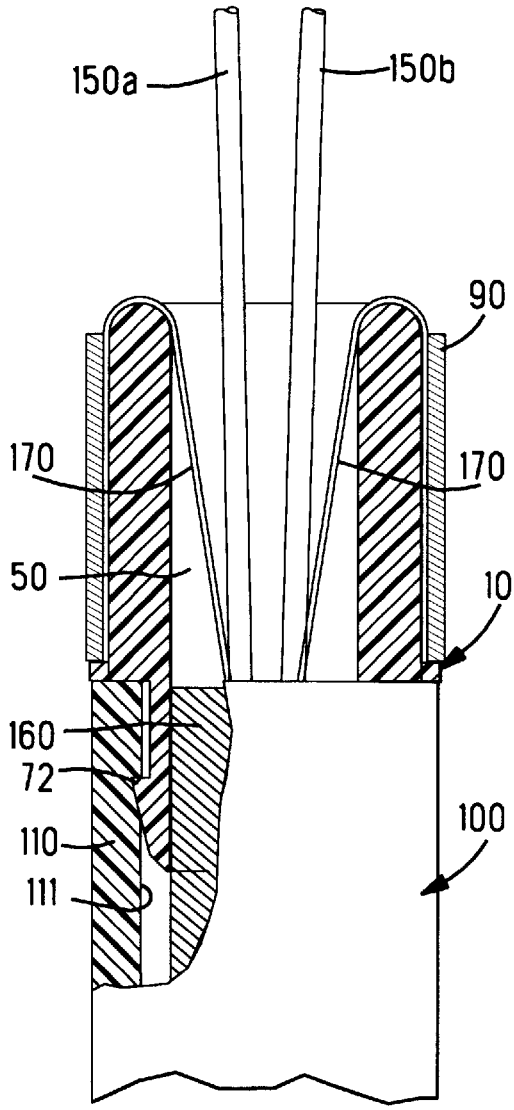
FIG. 6 shows the cap member and sleeve member assembled onto the stripped end of the fiber optic cable.

FIGS. 5 and 6 show part cross-sectional views which illustrate the optical fiber cable terminal structure with FIG. 5 showing the state prior to press-fitting of sleeve member 90 onto cap member 10, and FIG. 6 shows the state following the completion of press-fitting. Optical fiber cable 100 is shown in FIG. 5, and in a part cross-sectional view in FIG. 6.

As shown in FIG. 6, the optical fiber cable 100 is attached to the cap member 10. The optical fiber cable 100 includes an outer covering 110, two optical fibers 150a and 150b, a reinforcing member 170 which is accommodated inside the outer covering 110 for purposes of reinforcement, and a cotton yarn 160 which fills the space between the optical fibers 150a and 150b and the outer covering 110. The reinforcing member 170 is formed from a carbon fiber material such as Kevlar (registered trademark of Du Pont Co. U.S.A.) In the initial stage of assembly shown in FIG. 5, the optical fiber cable 100, cap member 10 and sleeve member 90 are arranged roughly in a straight line. In this case, the optical fibers 150a and 150b and reinforcing member 170 are passed through the cavity 50 of the cap member 10, and the optical fibers 150a and 150b alone are further passed through the substantially cylindrical sleeve member 90. The optical fiber cable 100 is subjected to a normal stripping operation beforehand so that the optical fibers 150a and 150b and the reinforcing member 170 extend an appropriate distance beyond the outer covering 110.

The outer covering 110 of the optical fiber cable 100 is engaged with the cap member 10. As shown in FIG. 6, the outer covering 110 is superimposed on the outer circumference of the outer covering engaging section 70, so that the inside surface 111 of the outer covering 110 is in an engaged state with the projections 72. The inclined bottom surface 73 smoothly guides the movement of the outer covering 110 onto the outside surface 71 of the outer covering engaging section 70. Furthermore, the rear surface 31 acts as a limiting surface which stops the end of the outer covering 110. The optical fibers 150a and 150b are caused to extend from the cap member 10 for the purpose of optical connections with other devices. Meanwhile, the reinforcing member 170 is extended forward through the cavity 50 of the main body section 30, and is then folded back along the curved surface 35a and caused to extend rearward over the outside surface 32. In FIGS. 5 and 6, the reinforcing member 170 is shown as being folded back in two directions only; however, it would also be possible to fold the reinforcing member 170 back in three or more symmetrical angular directions. The folded-back reinforcing member 170 is fastened in place on the outside surface 32 by press-fitting of the cylindrical sleeve member 90 onto the main body section 30 with the reinforcing member 170 captured between the main body section 30 and sleeve member 90. The sleeve member 90 is preferably made of copper. As was described above, the outside surface 32 of the main body section 30 has indentations and projections formed by the grooves 33; accordingly, the reinforcing member 170 is firmly fastened to the outside surface 32 so that the reinforcing member 170 is prevented from slipping out. The wall 34 includes a sleeve-limiting shoulder 37 which accurately fixes the position of the sleeve member 90 along outside surface 32. Accordingly, the sleeve member 90 is stopped by the sleeve-limiting shoulder 37, so that the sleeve member 90 is not pushed further than the wall 34. If necessary, any unnecessary portion of the reinforcing member 170 which extends outward from the vicinity of the wall 34 can be trimmed away.

The engagement between the outer covering 110 of the optical fiber cable 100 and the outer covering engaging section 70 of the cap member 10 may come loose during the laying of the optical fiber cable 100. However, since both engaging parts are independent of the fastening part which fastens the reinforcing member 170, re-engagement can easily be accomplished. Specifically, as is clear from the above description, the reinforcing member 170 of the optical fiber cable 100 is fastened to the outside surface 32 of the main body section 30, and the outer covering 110 of the optical fiber cable 100 is fastened to the outer covering engaging section 70 which protrudes from the surface 31 of the main body section 30. Accordingly, even if the engagement of the outer covering 110 and the outer covering engaging section 70 should be released, the two parts can easily be re-engaged without any need for special attention to the fastening of the reinforcing member 170, and there is no deleterious effect on the fastening of the reinforcing member 170 during this re-engagement.

An optical fiber cable terminal structure constituting a cap member and a sleeve member has been described above. However, various modifications and alterations may be made by a person skilled in the art. For example, the indentations and projections formed in the outside surface 32 of the cap member 10 could be formed by various other conventional methods such as serrations, roulettes or threads, etc., instead of using the grooves 33 described above.

In the optical fiber cable terminal structure of the present invention, a substantially cylindrical cap member has a curved surface formed on one end, so that there is a smooth continuation between the inside and outside surfaces of the cap member. Furthermore, the cap member is arranged so that a reinforcing member, which is passed through the cap member and folded back over the end surface, can be fastened to the outside surface by a press-fitting sleeve.

Moreover, an engaging member which engages with an outer covering of an optical fiber cable is caused to protrude from the opposite end of the cap member. Accordingly, even in cases where a tensile force or twisting force is applied to the optical fiber cable, there is no danger that the reinforcing member will be cut. Furthermore, in cases where the engaging member and outer covering are re-engaged following accidental disengagement, this re-engagement operation can be easily performed without any deleterious effect on the fastening of the reinforcing member.

What is claimed is:

1. An optical fiber cable terminal structure for engagement with an outer covering of an optical fiber cable and securing a reinforcing member of the optical fiber cable thereto, comprising:

a cap member including a substantially cylindrical main body section along which the reinforcing member extends and a substantially cylindrical outer covering engaging section which engages a surface of the outer covering, said outer covering engaging section being fixedly mounted on said main body section;

a curved surface at one end of the main body section connecting an inner surface of the main body section with an outer surface of the main body section over which the reinforcing member extends and then extends along the outer surface of the main body section; and a sleeve member press-fittable onto the outer surface of the main body section capturing the reinforcing member between the sleeve member and the outer surface.

2. An optical fiber cable terminal structure as claimed in claim 1, wherein the thickness of the main body section is greater than that of the outer covering engaging section.

3. An optical fiber cable terminal structure as claimed in claim 2, wherein the outer covering engaging section and the main body section are coaxial with the outer covering engaging section extending from a surface of said main body section.

4. An optical fiber cable terminal structure as claimed in claim 3, wherein the inner surface has the same diameter along the main body section and said outer covering engaging section.

5. An optical fiber cable terminal structure as claimed in claim 4, wherein the outer covering engaging section is to be disposed along an inner surface of the outer covering of the optical fiber cable.

6. An optical fiber cable terminal structure as claimed in claim 5, wherein securing barbs are located on an outer surface of said outer covering engaging section.

7. An optical fiber cable terminal structure as claimed in claim 5, wherein a bottom surface of said outer covering engaging section is inclined.

8. An optical fiber cable terminal structure as claimed in claim 2, wherein an annular projection extends outwardly from the outer surface of the main body section against which the sleeve member engages thereby limiting the movement of the sleeve member along the outer surface.

* * * * *